United States Patent
Tucker

(10) Patent No.: US 11,026,534 B2
(45) Date of Patent: Jun. 8, 2021

(54) HANGING MOUNTING DEVICE

(71) Applicant: Demetrius L. Tucker, Madison, TN (US)

(72) Inventor: Demetrius L. Tucker, Madison, TN (US)

( * ) Notice: Subject to any disclaimer, the term of this patent is extended or adjusted under 35 U.S.C. 154(b) by 432 days.

(21) Appl. No.: 15/044,228

(22) Filed: Feb. 16, 2016

(65) Prior Publication Data
US 2016/0353912 A1    Dec. 8, 2016

Related U.S. Application Data
(60) Provisional application No. 62/171,940, filed on Jun. 5, 2015.

(51) Int. Cl.
| | |
|---|---|
| *A47H 13/04* | (2006.01) |
| *A47K 3/28* | (2006.01) |
| *A47K 3/38* | (2006.01) |
| *A47H 23/00* | (2006.01) |
| *A47H 13/00* | (2006.01) |
| *A47H 1/00* | (2006.01) |
| *F16B 1/00* | (2006.01) |
| *A47G 1/17* | (2006.01) |

(52) U.S. Cl.
CPC ............ *A47H 1/00* (2013.01); *A47G 1/17* (2013.01); *A47H 13/04* (2013.01); *A47H 23/00* (2013.01); *A47H 2201/01* (2013.01); *A47H 2201/02* (2013.01); *A47K 3/38* (2013.01); *F16B 2001/0035* (2013.01)

(58) Field of Classification Search
CPC ............ A47H 1/00; A47H 2201/01; A47H 2001/0035; A47H 13/04; A47H 23/00; A47H 2201/02; F16M 13/02; F16B 1/00; F16B 47/003; F16B 2001/0035; A47G 25/485; A47G 1/17; A47K 3/38
USPC .............. 248/215, 214; 160/327, 354, 368.1, 160/DIG. 16
See application file for complete search history.

(56) References Cited

U.S. PATENT DOCUMENTS

| | | | | |
|---|---|---|---|---|
| 3,164,352 A | * | 1/1965 | Weaver | A41G 1/00 248/214 |
| 3,629,905 A | * | 12/1971 | Cote | B65D 33/1675 24/30.5 R |
| 3,857,432 A | * | 12/1974 | Russell | A47H 1/00 160/124 |
| 4,310,137 A | * | 1/1982 | Frye | F16B 47/003 248/205.3 |

(Continued)

OTHER PUBLICATIONS

K&J Magnetics, Inc., "MMR-A-ZX8 Specification Sheet," printed May 28, 2015, 1 page.

(Continued)

*Primary Examiner* — Tan Le
(74) *Attorney, Agent, or Firm* — LaBatt, LLC

(57) ABSTRACT

Aspects of the invention provide a solution for mounting a hanging using a set of mounting devices including magnets. A mounting device includes a first and second portions at least one of which generates a magnetic field, such that a surface of the first portion is attracted to a surface of the second portion. The first portion includes another surface configured to be secured to a support structure. The hanging can be at least partially supported by placing a portion of the hanging between the attractive surfaces of the first and second portions.

20 Claims, 3 Drawing Sheets

(56) References Cited

U.S. PATENT DOCUMENTS

| | | | | |
|---|---|---|---|---|
| 4,528,493 | A * | 7/1985 | Spencer | H02H 7/065 322/99 |
| 5,517,722 | A * | 5/1996 | Bender | A47H 19/00 16/87.2 |
| 5,682,653 | A * | 11/1997 | Berglof | G09F 1/10 24/303 |
| 6,041,454 | A * | 3/2000 | Summerford | A47H 13/00 160/330 |
| 8,220,188 | B1 * | 7/2012 | Keller | G09F 7/04 40/593 |
| 2008/0120865 | A1 * | 5/2008 | Smith | F26B 25/18 34/239 |
| 2011/0219587 | A1 | 9/2011 | Nizan et al. | |
| 2012/0299674 | A1 * | 11/2012 | Montone | H01F 7/0221 335/285 |
| 2014/0166215 | A1 * | 6/2014 | Thomas | A47H 2/00 160/38 |
| 2015/0316341 | A1 * | 11/2015 | Aguilar | F41A 9/83 42/87 |
| 2018/0051827 | A1 * | 2/2018 | Garvin | H01F 7/0221 |

OTHER PUBLICATIONS

K&J Magnetics, Inc., "MM-A-75 Specification Sheet," printed May 28, 2015, 1 page.

K&J Magnetics, Inc., "MM-A-48 Specification Sheet," printed May 28, 2015, 1 page.

3M, Command Brand Instructions, 17003, 1 page, accessed May 28, 2015, command.com.

3M, Command Brand Instructions, 17206BLK, 1 page, accessed May 28, 2015, command.com.

3M, Command Large Hook, 231, 2 pages, accessed May 28, 2015, command.com.

3M, Command Clothes Hanger, 231, 2 pages, accessed May 28, 2015, command.com.

* cited by examiner

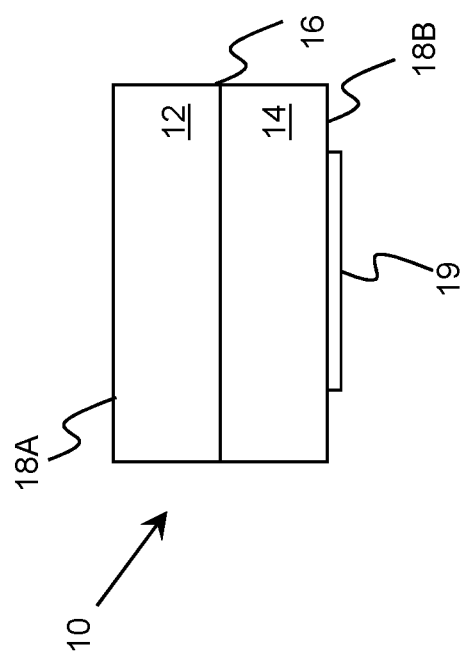

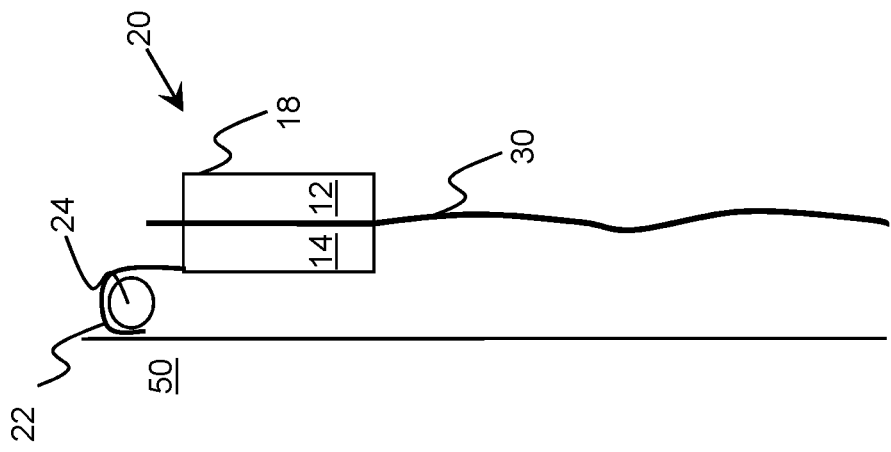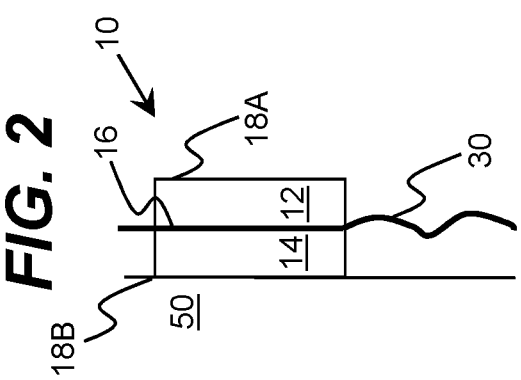

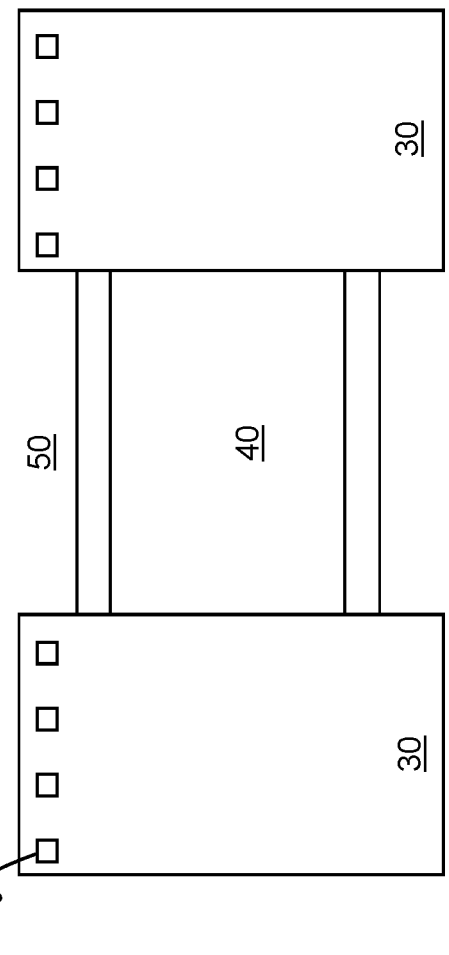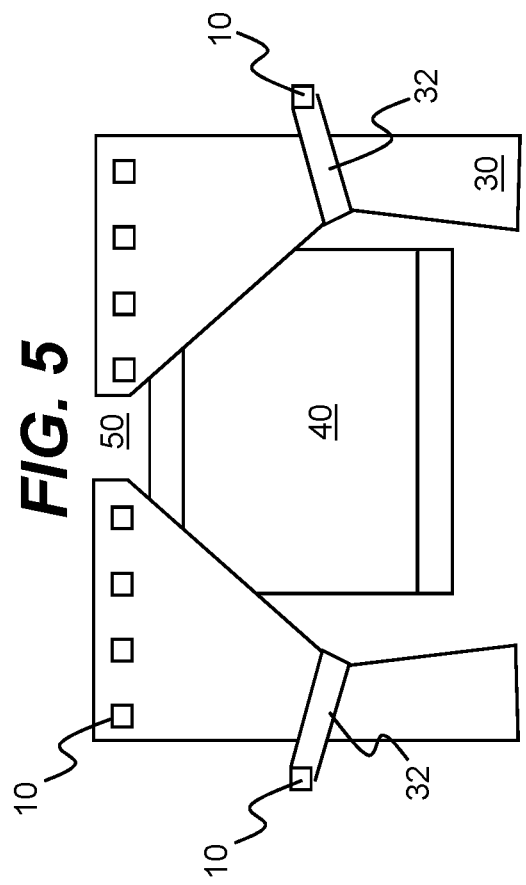

HANGING MOUNTING DEVICE

REFERENCE TO RELATED APPLICATIONS

The current application claims the benefit of U.S. Provisional Application No. 62/171,940, which was filed on 5 Jun. 2015, and which is hereby incorporated by reference.

TECHNICAL FIELD

The disclosure relates generally to drapery, and more particularly, to a holder for drapery, such as window curtains, door coverings, wall hangings, and/or the like.

BACKGROUND ART

For openings, such as windows, doors, and/or the like, drapery is often used to shield from the elements (e.g., the sun) and/or provide privacy. In order to properly hang drapery, the use of expensive and time consuming mounting systems and hardware are currently required. For example, for window curtains, a rod with corresponding hardware is often used to hang a window curtain over a window. However, in order to hang the window curtain, the rod must first be attached to the wall above the window.

Attaching the rod to the wall can be quite cumbersome because it requires measuring where to place the rod, using several tools, and using a ladder. Also, holes must be drilled into the wall in order to attach the hardware for the rod to the wall. If the holes are measured incorrectly, the wall is aesthetically damaged and the incorrect holes may need to be covered. Only after the hardware for the rod is installed, can the rod be strung through a hole of the window curtain and hung up.

SUMMARY OF THE INVENTION

Aspects of the invention provide a solution for mounting a hanging (e.g., drapery, such as window curtains, shower curtains, door coverings, and/or the like), using magnets.

A first aspect of the invention provides a mounting device comprising: a first portion having a first surface; a second portion having a second surface, wherein at least one of: the first or second portion generates a magnetic field, such that the first and second surfaces are attracted to one another; and means for attaching a third surface of the first portion, opposite the first surface, to a support structure.

A second aspect of the invention provides a mounting system comprising: a set of mounting devices configured to mount a hanging to a support structure, each mounting device comprising: a first portion having a first surface; a second portion having a second surface, wherein at least one of: the first or second portion generates a magnetic field, such that the first and second surfaces are attracted to one another with the hanging located there between; and means for attaching a third surface of the first portion, opposite the first surface, to the support structure.

A third aspect of the invention provides a method of mounting a hanging to a support structure comprising: providing a plurality of mounting devices, each mounting device comprising: a first portion having a first surface; a second portion having a second surface, wherein at least one of: the first or second portion generates a magnetic field, such that the first and second surfaces are attracted to one another with the hanging located there between; and means for attaching a third surface of the first portion, opposite the first surface, to the support structure; and placing a first end of the hanging between the first and second surfaces of each of the plurality of mounting devices.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 shows an illustrative drapery mounting device according to an embodiment.

FIG. 2 shows a side view of a drapery mounting device on a support structure according to an embodiment.

FIG. 3 shows a side view of a drapery mounting device on a support structure according to an embodiment.

FIG. 4 shows drapery hanging on a support structure over a window using illustrative drapery mounting devices according to an embodiment.

FIG. 5 shows drapery hanging on a support structure over a window using illustrative drapery mounting devices according to another embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for mounting a hanging (e.g., drapery, such as window curtains, shower curtains, door coverings, and/or the like), using magnets. As used herein, unless otherwise noted, the term "set" means one or more (i.e., at least one) and the phrase "any solution" means any now known or later developed solution.

Turning now to FIG. 1, an illustrative drapery mounting device 10 according to an embodiment is shown. A drapery mounting device 10 includes a first portion 12 and a second portion 14. In an embodiment, at least one of the first portion 12 or the second portion 14 produces a magnetic field. The first and/or second portions 12, 14 can be formed of any ferromagnetic metal material that produces a magnetic field, such as, iron, nickel, cobalt, and/or the like. When not magnetic, the other of the first portion 12 or the second portion 14 is formed of a material attracted to the magnetic field, such as a material capable of becoming magnetic. The magnetic field(s) created by the first and/or second portions 12, 14 causes a force to attract the first and second portions 12, 14, to one another along an interface 16. For example, the poles of the magnetic fields created by each portion 12, 14 can be opposite at the interface 16, so that the first and second portions 12, 14 have a strong connection to each other. In another embodiment, one of the first portion 12 or the second portion 14 does not create a magnetic field, but is formed of a material to which the other of the first portion 12 or the second portion 14 is attracted as a result of a magnetic field created thereby. To this extent, the first portion 12 can be formed of any ferromagnetic metal material that produces a magnetic field, and the second portion 14 can be formed of any ferromagnetic metal material that attracts the first portion 12. For example, the second portion 14 can be a plate that is formed of iron (e.g., steel), nickel, and/or the like alloys. Regardless, the first and second portions 12, 14 can have a magnetic pull force in the range of approximately 3 pounds to approximately 400 pounds.

The drapery mounting device 10 includes a first and a second surface 18A, 18B. One of the surfaces, e.g., the first surface 18A, can be the part of the drapery mounting device 10 configured to be visible to a user. This first surface 18A can include any type of decorative design. The other of the surfaces, e.g., the second surface 18B, can include a means for attaching the drapery mounting device 10 to a support structure, such as a wall, rod, beam, roof or other outdoor structure, a stair case, an edge of flooring or decking, and/or the like. For example, the second surface 18B can include an adhesive material 19, such as the Command™ Adhesive, and/or the like. The adhesive material 19 can be a removable adhesive, so that the second portion 14 can be removed and/or released from the attachment to the support structure (e.g., wall, rod, roof or other outdoor structure, a stair case, and edge of flooring or decking, and/or the like). For example, the second portion 14 can be removed and/or released from the support structure by pulling down a portion of the adhesive material on the second portion 14. The second surface 18B, e.g., via the adhesive material 19, can be attached to any surface to which the drapery can be mounted (e.g., a support structure). In another embodiment, the second portion 14 can include a hook 22, as shown in FIG. 3, for attaching a drapery mounting device 20 to a rod 24 that is already attached to the support structure 50 using any solution. In this embodiment, a drapery (e.g., curtain) 30 can be easily hung on an existing rod 24, without removing the rod 24 from the support structure 50. Furthermore, such a mounting can allow the drapery 30 to be selectively opened and closed.

The first and second portions 12, 14 of the drapery mounting device 10 shown in FIG. 1 are shown having rectangular cross sections. Similarly, the surfaces 18A, 18B can have a rectangular shape. However, it is understood that the first and second portions 12, 14 can include any shape. For example, the surfaces 18A, 18B of the first and second portions 12, 14 of the drapery mounting device 10 can be elliptical (e.g., circular). In another embodiment, the first magnetic portion 12 can include a first shape and the second portion 14 can include a second shape, and the first and second shape can differ. For example, the surface 18A of the first portion 12 can have a shape, surface treatment, and/or the like, which is visibly appealing. Furthermore, while shown as having a substantially similar size, it is understood that the first and second portions 12, 14 can have different sizes and/or sizes (cross-section and/or surfaces) that vary and/or are irregular.

Turning now to FIG. 2, a side view of a drapery mounting device 10 attached to a support structure 50 (e.g., a wall) according to an embodiment is shown. As shown, drapery (e.g., curtain) 30 is placed at the interface 16 between the first and second portions 12, 14. The first surface 18A, which can include any decorative design, is visible to a user. The second surface 18B is attached to the support structure 50, e.g., via an adhesive material 19 (FIG. 1) that is located on the surface 18B between the second portion 14 and the support structure 50.

FIG. 4 shows a front view of the support structure 50 (e.g., a wall) including a window 40 and drapery (e.g., curtains 30), which is used to cover at least a portion of the window 40. A set of drapery mounting devices 10 are used to attach the curtains 30 to the support structure 50 over the window 40. It is understood that any number of drapery mounting devices can be used to attach the drapery 30. A number of drapery mounting devices 10 can vary based on one or more of: the size (e.g., width) of the drapery that is used, weight of the drapery, the spacing desired between each of the drapery mounting devices 10, and/or the like. For example, in the embodiment shown in FIG. 4, four drapery mounting devices 10 are used for each drapery 30. However, if for aesthetic purposes, a draped look is desired, one of the drapery mounting devices 10 could easily be removed from each drapery 30 and the spacing between the three remaining drapery mounting devices 10 could easily be adjusted without completely removing the drapery 30 from the support structure 50.

It is understood that a curtain is only illustrative of the various types of items capable of being mounted using a drapery mounding device 10 described herein. Furthermore, one or more drapery mounting devices 10 can be utilized to mount ancillary items relating to the drapery. For example, as shown in FIG. 5, each drapery 30 can be selectively pulled back and held in place using a tie 32 (e.g., a rope, fabric, or the like), which is held to the support structure 50 by a drapery mounting device 10 (e.g., both ends of the tie 32 are inserted between the portions 12, 14).

In an embodiment, a method of mounting the drapery mounting device 10 including the drapery 30 to the support structure 50 can include inserting the drapery between the first and second portions 12, 14, as shown in FIG. 2, and attaching the second surface 18B (FIG. 2) of the drapery mounting device 10 to the support structure 50. In another embodiment, the second portion 14 can be first attached to the support structure 50 by the second surface 18B of the drapery mounting device 10. Then, the drapery 30 can be placed against the second portion 14 at the interface 16 (FIG. 2) prior to placing the first portion 12 against the drapery 30 opposite to the second portion 14.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A mounting device comprising:
    a first portion;
    a second portion, wherein at least one of the first or second portion generates a magnetic field, such that the first and second portions are attracted to one another to support a hanging located there between; and
    a j-shaped hook, wherein a first end of the j-shaped hook is fixedly attached to the first portion, wherein the j-shaped hook is configured to attach the first portion to a support structure including a rod, wherein a second end of the j-shaped hook is configured to hook onto the rod such that the first portion and the second portion are substantially vertically oriented.

2. The device of claim 1, wherein both the first and second portions generate magnetic fields.

3. The device of claim 1, wherein the mounting device is configured to mount the hanging to the support structure.

4. The device of claim 3, wherein the hanging is a drapery.

5. The device of claim 1, wherein the first portion and the second portion are formed of a ferromagnetic metal material.

6. The device of claim 1, wherein the first magnetic portion and the second portion have a magnetic pull force in the range of approximately 3 pounds to approximately 400 pounds.

7. A mounting system comprising:
a plurality of mounting devices configured to mount a single hanging to a support structure, wherein each mounting device is configured to be located at a unique location along an edge of the single hanging in order to support the single hanging, and wherein each mounting device includes:
a first portion;
a second portion, wherein at least one of the first or second portion generates a magnetic field, such that the first and second portions are attracted to one another with the hanging located there between; and
a j-shaped hook, wherein a first end of the j-shaped hook is fixedly attached to the first portion, wherein the j-shaped hook is configured to attach the first portion to the support structure including a rod, wherein a second end of the j-shaped hook is configured to hook onto the rod such that the first portion and the second portion are substantially vertically oriented.

8. The device of claim 7, wherein the hanging is a drapery.

9. The system of claim 7, wherein the plurality of mounting devices are capable of moving laterally along the rod.

10. The system of claim 7, wherein both the first and second portions generate magnetic fields.

11. The system of claim 7, wherein the first and second portions are formed of a ferromagnetic metal material.

12. The system of claim 7, wherein the first and second magnetic portions have a magnetic pull force in the range of approximately 3 pounds to approximately 400 pounds.

13. A method of mounting a single hanging to a support structure comprising:
providing a plurality of mounting devices, wherein each mounting device is configured to be located at a unique location along an edge of the single hanging in order to support the single hanging, and wherein each mounting device includes:
a first portion;
a second portion, wherein at least one of the first or second portion generates a magnetic field, such that the first and second portions are attracted to one another with the hanging located there between; and
a j-shaped hook, wherein a first end of the j-shaped hook is fixedly attached to the first portion, wherein the j-shaped hook is configured to attach the first portion to the support structure including a rod, wherein a second end of the j-shaped hook is configured to hook into the rod such that the first portion and the second portion are substantially vertically oriented; and
placing a first end of the hanging between the first and second portions of each of the plurality of mounting devices.

14. The method of claim 13, further comprising attaching the first portion of each of the plurality of mounting devices to the support structure.

15. The method of claim 14, wherein attaching the first portion of each of the plurality of mounting devices to the support structure includes:
hanging each hook onto the rod; and
moving, laterally, each of the plurality of mounting devices along the rod.

16. The method of claim 13, wherein the first portion and the second portion are formed of a ferromagnetic metal material.

17. The method of claim 13, wherein both the first and second portions generate magnetic fields.

18. The method of claim 13, wherein the hanging is a drapery.

19. The method of claim 13, wherein the first portion and the second portion have a magnetic pull force in the range of approximately 3 pounds to approximately 400 pounds.

20. The mounting device of claim 1, wherein the j-shaped hook is fixedly attached to a top end of the first portion.

* * * * *